(12) United States Patent
Van Der Woning et al.

(10) Patent No.: US 10,034,571 B2
(45) Date of Patent: Jul. 31, 2018

(54) LIQUID VOLUME MEASUREMENT DEVICE

(71) Applicant: KONINKLIJKE PHILIPS N.V., Eindhoven (NL)

(72) Inventors: Mark Ronald Van Der Woning, Eindhoven (NL); Hendrikus Lodewijk Joseph Franciscus Holten, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/512,853

(22) PCT Filed: Sep. 10, 2015

(86) PCT No.: PCT/EP2015/070673
§ 371 (c)(1),
(2) Date: Mar. 21, 2017

(87) PCT Pub. No.: WO2016/045975
PCT Pub. Date: Mar. 31, 2016

(65) Prior Publication Data
US 2017/0295990 A1   Oct. 19, 2017

(30) Foreign Application Priority Data
Sep. 23, 2014   (EP) .................................... 14185990

(51) Int. Cl.
*A47J 31/00* (2006.01)
*A47J 31/44* (2006.01)
(Continued)

(52) U.S. Cl.
CPC ............ *A47J 31/44* (2013.01); *B67D 1/0009* (2013.01); *G01F 15/07* (2013.01); *G01F 22/00* (2013.01); *A47J 31/00* (2013.01); *A47J 31/4457* (2013.01); *B67D 2210/00157* (2013.01); *G01F 23/00* (2013.01)

(58) Field of Classification Search
CPC .. A47J 31/44; A47J 31/06; A47J 31/00; A47J 31/4457; B67D 1/0009; B67D 2210/00157; G01F 15/07; G01F 22/00; G01F 23/00
See application file for complete search history.

(56) References Cited

U.S. PATENT DOCUMENTS 2,826,067 A * 3/1958 Braunlich ........... F04D 15/0088
                                                 73/168
4,856,343 A     8/1989 Hon
(Continued)

FOREIGN PATENT DOCUMENTS

EP      1514500 A1   3/2005
GB      2320093 A    6/1998
(Continued)

*Primary Examiner* — Frederick C Nicolas

(57) ABSTRACT

The present invention relates to a measurement device (10) for measuring a volume of liquid contained in a vessel, comprising: —a main vessel (12) for receiving a liquid; —a reference vessel (14) which has a smaller volume than the main vessel (12), wherein the main vessel (12) and the reference vessel (14) are fluidly connectable to each other as communicating vessels; —a pump (16) which is connected to the main vessel (12) and the reference vessel (14) for extracting liquid from the main vessel (12) and the reference vessel (14); —a minimum level sensor (26) which is configured to send a reference signal if a minimum liquid level within the reference vessel (14) is reached; —a first valve (20, 20') via which the reference vessel (14) is fluidly connected to the pump (16), wherein the first valve (20, 20') is configured to be closed off if the minimum liquid level within the reference vessel (14) is reached; and —a control unit (30) which is connected to the minimum level sensor (26, 26') and the pump (16) and configured to measure a (Continued)

reference time between an activation of the pump (16) and a receipt of the reference signal, wherein the control unit (30) is further configured to calculate, based on the reference time and a flow rate of the pump (16), a liquid volume within the main vessel (12) and/or a total liquid volume within the main vessel (12) and the reference vessel (14) together." has been deleted and —The present invention relates to a measurement device (10) for measuring a volume of liquid contained in a vessel, including: —a main vessel (12) for receiving a liquid; —a reference vessel (14) which has a smaller volume than the main vessel (12), wherein the main vessel (12) and the reference vessel (14) are fluidly connectable to each other as communicating vessels; —a pump (16) which is connected to the main vessel (12) and the reference vessel (14) for extracting liquid from the main vessel (12) and the reference vessel (14); —a minimum level sensor (26) which is configured to send a reference signal if a minimum liquid level within the reference vessel (14) is reached; —a first valve (20, 20') via which the reference vessel (14) is fluidly connected to the pump (16), wherein the first valve (20, 20') is configured to be closed off if the minimum liquid level within the reference vessel (14) is reached; and —a control unit (30) which is connected to the minimum level sensor (26, 26') and the pump (16) and configured to measure a reference time between an activation of the pump (16) and a receipt of the reference signal, wherein the control unit (30) is further configured to calculate, based on the reference time and a flow rate of the pump (16), a liquid volume within the main vessel (12) and/or a total liquid volume within the main vessel (12) and the reference vessel (14) together.

14 Claims, 3 Drawing Sheets

(51) Int. Cl.
  *G01F 15/07*   (2006.01)
  *G01F 22/00*   (2006.01)
  *G01F 23/00*   (2006.01)
  *B67D 1/00*    (2006.01)

(56) References Cited

U.S. PATENT DOCUMENTS

| | | | |
|---|---|---|---|
| 5,083,504 A * | 1/1992 | Koga | A47J 31/32 99/295 |
| 5,388,501 A | 2/1995 | Hazan | |
| 7,104,422 B2 * | 9/2006 | DiLeo | B67D 1/1234 222/204 |
| 8,387,516 B1 | 3/2013 | Reynolds | |
| 2003/0126993 A1 | 7/2003 | Lassota | |
| 2004/0118292 A1 | 6/2004 | Font | |

FOREIGN PATENT DOCUMENTS

| | | |
|---|---|---|
| WO | 9827853 A1 | 7/1998 |
| WO | 0160221 A1 | 8/2001 |
| WO | 2007069135 A2 | 6/2007 |

* cited by examiner

LIQUID VOLUME MEASUREMENT DEVICE

This application is the U.S. National Phase application under 35 U.S.C. § 371 of International Application No. PCT/EP2015/070673, filed on Sep. 10, 2015, which claims the benefit of International Application No. 14185990.0 filed on Sep. 23, 2014. These applications are hereby incorporated by reference herein.

FIELD OF THE INVENTION

The present invention relates to a measurement device for measuring a volume of liquid contained in a vessel, tank or container. Said measurement device may be applied particularly in a beverage dispensing machine. Examples of such beverage dispensing machines are manual, semi-automatic, fully automatic and any type of single-serve coffee and/or espresso coffee machines. The presented measurement device is, however, not limited to the use in such an appliance.

BACKGROUND OF THE INVENTION

Beverage dispensing machines are often equipped with a liquid container, e.g. a water tank that is usually located on the backside of the machine. Those liquid containers contain a defined amount of liquid with which, depending on a chosen recipe, a couple of drinks, e.g. coffee drinks, can be made. Often these liquid containers are equipped with a minimum level sensor to avoid that the pump, which is used for extracting the liquid from the liquid container, starts to run dry. These minimum level sensors usually also send a signal to the user indicating that the liquid container is empty and needs to be refilled.

Nowadays coffee machines often use minimum level sensors that comprise a float with a magnet that relates to a Hall sensor. The Hall sensor is located at a minimum level of the water tank, so that the device can signal if the recipe, i.e. the type of coffee selected by the user, may be produced with the water content available in the water tank.

The problem with the aforementioned minimum level sensors is that they are not very precise. Also these sensors are usually located at a minimum liquid level that relates to the volume of the largest drink/recipe that is possible with the machine. In some cases it might thus happen that a user selects only a small drink (e.g. an espresso), wherein the appliance indicates that the water tank needs to be refilled, even though this would actually not be necessary. If the minimum liquid level is, for example, set to 180 ml, the system would not allow brewing any coffee or espresso, even if the recipe ordered by the user requires only 80 ml.

Since the water tanks are usually located on the backside of the machines, it is also difficult for the user to visually judge the water content of the tank. Thus, there is a need for measuring the volume of the water tank in a precise way and allowing the machine to brew a coffee or espresso if the available water content is suitable to brew the kind of coffee or espresso selected by the user.

Conventional manual coffee machines often use a manual scale reading which is arranged at a riser pipe that is fluidly connected to the water tank. Such a system is exemplarily known from EP 1 514 500 A1. The therein shown system comprises a main tank and a riser pipe which are fluidly connected to each other as communicating vessels. The riser pipe contains a float by means of which the user may visually identify the water level within the main tank. Such a system, however, only helps to indicate the relative water level within the main tank, but does not solve the above-mentioned problems that the user should be informed whether the remaining water content in the main tank is sufficient for the recipe he/she has chosen and that it should be electronically prevented that the main tank gets empty during coffee brewing such that the pump is running dry.

Of course, there are also more sophisticated measurement devices and sensors available in the market that meet the above-mentioned requirements and allow measuring the volume of water within a water tank in a very precise manner. However, these measurement devices and sensors most of the times require a rather expensive equipment which would disproportionally increase the manufacturing costs.

WO 98/27853 A1 discloses a coffee maker comprising a water reservoir, a water heating and supply device for supplying hot water to a filter device, the brewed coffee flowing from the filter device to a receptacle. The coffee maker includes a level detection circuit for detecting the water level in the reservoir, and this water level is used to control the brewing process so as to vary the flow of hot water to the filter device in dependence upon the water level in the reservoir. The water level may be used to control the power of a heating element in a continuous heater or may be used to control the operation of a pump in a pumped system.

US 2004/118292 A1 discloses an appliance for the preparation of hot drinks. The appliance includes a water container having a container outlet from which, via a heating device and a riser, water heated by the heating device can be supplied to a mixing device. A specific water level height in the riser can be kept at least largely constant by a constant level holding device.

GB 2 320 093 A discloses a method for totalizing the volume of liquid pumped to or from a vessel by a set of pumps.

SUMMARY OF THE INVENTION

It is an object of the present invention to provide a measurement device for measuring a volume of liquid contained in a vessel, wherein the measurement device is applicable in a beverage dispensing machine. In particular, it is an object of the present invention to provide a measurement device that allows a rather precise measurement of the liquid content within the vessel, but is cost-saving regarding its manufacturing costs.

In a first aspect of the present invention, a measurement device for measuring a volume of liquid contained in a vessel is presented that comprises:
- a main vessel for receiving a liquid;
- a reference vessel which has a smaller volume than the main vessel, wherein the main vessel and the reference vessel are fluidly connectable to each other as communicating vessels;
- a pump which is connected to the main vessel and the reference vessel for extracting liquid from the main vessel and the reference vessel;
- a minimum level sensor which is configured to send a reference signal if a minimum liquid level within the reference vessel is reached;
- a first valve via which the reference vessel is fluidly connected to the pump, wherein the first valve is configured to be closed off if the minimum liquid level within the reference vessel is reached; and
- a control unit which is connected to the minimum level sensor and the pump and configured to measure a reference time between an activation of the pump and a receipt of the reference signal, wherein the control unit is further configured to calculate, based on the reference time and a flow rate of the pump, a liquid volume within the main vessel and/or a total liquid volume within the main vessel and the reference vessel together.

In a further aspect of the present invention, a beverage dispensing machine is presented that comprises the above-mentioned measurement device.

The present measurement device makes use of two communicating vessels, i.e. a main vessel and a reference vessel. The main vessel represents the main liquid tank of the appliance, whereas the reference vessels may be realized in the form of a riser pipe. Due to the hydraulic connection of these two vessels as two communicating vessels, the liquid will balance out in both vessels regardless of the shape and volume of these vessels. The physical principle of such communicating vessels is sometimes also denoted as hydrostatic paradox. In other words, this means that the height of the liquid level is in both vessels the same, since it may be assumed that the ambient pressure (e.g. atmospheric pressure) is the same in both vessels.

It is furthermore important to note that the reference vessel has a smaller volume than the main vessel and that both vessels are connected to the pump. The volume of the reference vessel is preferably much smaller than the volume of the main vessel. The volume of the reference vessel may, for example, be in the order of 20% or less, even more preferably in the order of 10% or less of the volume of the main vessel. An actuation of the pump will thus cause the reference vessel to empty much faster than the main vessel.

Since the pump is fluidly connected to both vessels, the pump will in the beginning extract liquid from both vessels until the reference vessel is empty. Afterwards, the pump may only extract liquid from the main vessel. Depending on the liquid volume contained in the main vessel and the reference vessel before the pump starts to work, it will thus take a certain amount of time until the reference vessel is empty. The presented measurement device comprises a minimum level sensor which is arranged at or within the reference vessel. This minimum level sensor detects a minimum liquid level within the reference vessel, e.g. if the reference vessel is empty. Since the minimum level sensor only has to be configured to measure if the reference vessel is empty or not, a fairly simple and cost-saving sensor may be used. As soon as the minimum level sensor detects that the reference vessel is empty, it sends out a signal (herein denoted as reference signal) to the control unit. Since the control unit is also connected to the pump and controls the pump, the control unit also knows at what time the pump has been started. The control unit may thus measure the time (herein denoted as reference time) between the activation/start of the pump and the receipt of the reference signal indicating that the reference vessel is empty. This measured reference time denotes the time it takes to empty the reference vessel.

Since it may be assumed that the pump provides a flow rate that is constant over time, the reference time may be used to calculate the liquid volume that was originally in the reference vessel (before the actuation of the pump). This easily follows from the fact that the reference time is approximately or even exactly proportional to the liquid volume within the reference vessel before activation of the pump. Said volume may thus be calculated as follows:

$$V_{ref} = \theta_{pump} \times t_{ref} \quad (1)$$

wherein $V_{ref}$ denotes the liquid volume in the reference vessel at the beginning, $\theta_{pump}$ denotes the flow rate of the pump, and $t_{ref}$ denotes the reference time. It shall be noted that this calculation is, depending on the embodiment of the herein presented measurement device, more or less exact. The calculation is absolutely accurate if the flow rate of the pump is constant over time and if it is ensured that the liquid is extracted in the beginning only from the reference vessel until it is empty. However, the reference volume $V_{ref}$ may also be calculated in an accurate manner if the liquid is extracted directly from both the reference vessel and the main vessel, since it may then be assumed that the same amount of liquid leaves the main vessel and the reference vessel until the reference vessel is empty. The measured reference time $t_{ref}$ therefore only has to be corrected with the ratio of the amount of liquid leaving the main vessel relative to the amount of liquid leaving the reference vessel. If it is e.g. assumed that at the beginning the same amount of liquid is extracted from each of the vessels, $t_{ref}$ just needs to be divided by 2 in the above-mentioned calculation. It shall be also noted that relatively good approximations may be given if the flow rate of the pump is not absolutely constant over time. In this case, an average flow rate may be used as $\theta_{pump}$. The measurement device may also comprise a means for measuring the liquid flow rate with which the liquid is extracted from the main vessel and the reference vessel by means of the pump. However, such a means is not absolutely necessary if the pump has a defined flow rate.

Due to the above-mentioned principle of communicating vessels, it furthermore follows that the volume $V_{ref}$ within the reference vessel before actuating the pump is proportional to the liquid volume $V_{main}$ within the main vessel before actuating the pump ($V_{ref} \sim V_{main}$) and also proportional to the total liquid volume $V_{total}$ that is in the whole measurement device (within the main vessel and the reference vessel together) before actuating the pump ($V_{ref} \sim V_{total}$). Based on the reference time and the flow rate of the pump, the control unit may thus not only calculate the liquid volume within the reference vessel $V_{ref}$, but also calculate the liquid volume $V_{main}$ within the main vessel and/or the total liquid volume $V_{total}$ within the main vessel and the reference vessel together. In summary, this means that the measurement device is able to calculate the liquid volume within the water tank (the main vessel) and/or the total liquid volume within the device, wherein it only needs a fairly simple and cost-saving sensor (the minimum level sensor). The presented measurement device may therefore be applied in any type of beverage dispensing machine, is easy to implement and cost-saving in production.

According to an embodiment, the measurement device may further comprise a selector for selecting an amount of liquid to be extracted from the main vessel and the reference vessel by means of the pump during an extraction event, wherein an extraction event denotes the event between an activation and a subsequent deactivation of the pump.

In a coffee machine such an extraction event may thus be the brewing process of one coffee. The user may select either directly or indirectly the amount of liquid to be used for the coffee. The selector may be implemented mechanically or electronically. It shall be also noted that selecting the amount of liquid to be extracted equals the time the pump is activated during the brewing process/extraction event, as long as a constant (average) flow rate of the pump is achieved.

The selector is preferably also connected to the control unit such that the control unit may control the pump accordingly. The control unit may in this case be configured to calculate the liquid volume within the main vessel and/or the total liquid volume additionally based on the selected amount of liquid. Since the control unit is, in other words, then also aware of the amount of liquid that is extracted during an extraction event, the control unit may calculate the liquid volume within the main vessel after the extraction event:

$$V_{main(t2)} = V_{main(t1)} - V_{dose} \quad (2)$$

wherein $V_{main(t2)}$ denotes the liquid volume within the main vessel after an extraction event, $V_{main(t1)}$ denotes the liquid volume within the main vessel before the extraction event, and $V_{dose}$ denotes the selected volume that is extracted during the extraction event from the main vessel and the reference vessel together. It shall be noted that the above-mentioned equation requires $V_{ref}$ to be much smaller than $V_{main}$, so that $V_{main} \approx V_{total}$. If this is not the case, one has to additionally take into account the volume $V_{ref}$ that was in the reference vessel before the extraction event ($V_{ref(t1)}$) and after the extraction event ($V_{ref(t2)}$).

Equation 2 would then have to be modified as follows:

$$V_{main(t2)} = V_{main(t1)} - V_{dose} - (V_{ref(t2)} - V_{ref(t1)}) \quad (2')$$

wherein $V_{ref(t1)}$ and $V_{ref(t2)}$ may be calculated based on equation 1 indicated above. However, for the calculation of $V_{ref(t2)}$ based on equation 1 a second extraction step is needed in which $t_{ref(t2)}$ is measured.

One possibility for calculating the liquid volume within the main vessel by making use of the above-mentioned proportionality between $V_{ref}$ and $V_{main}$ is by making use of the geometrical dimensions of the main vessel and the reference vessel.

According to an embodiment, the control unit may be configured to calculate the liquid volume within the main vessel and/or the total liquid volume additionally based on a geometrical dimension of the main vessel and the reference vessel. This may exemplarily work as follows: As mentioned above, the reference time $t_{ref}$ and the flow rate of the pump $\theta_{pump}$ may be used to calculate the liquid volume within the reference vessel $V_{ref}$. Due to the connection between the main vessel and the reference vessel as communicating vessels, one further knows that the height of the liquid level is the same within the main vessel and the reference vessel. This leads to the following equations:

$$V_{ref} = h \times A_{ref} \quad (3)$$

$$V_{main} = h \times A_{main} \quad (4)$$

$$V_{main} = \frac{V_{ref}}{A_{ref}} \times A_{main} = \frac{\theta_{pump} \times t_{ref}}{A_{ref}} \times A_{main} \quad (5)$$

In the above-mentioned equations $A_{main}$ denotes the cross sectional area of the main vessel, and $A_{ref}$ denotes the cross-sectional area of the reference vessel. The cross-sectional areas of the main vessel and the reference vessel $A_{main}$ and $A_{ref}$ therefore only have to be programmed within the control unit. In the easiest case, $A_{main}$ and $A_{ref}$ remain constant along the height of each vessel. However, even if $A_{main}$ and $A_{ref}$ are not constant along the height of the vessels, the above-mentioned equations are valid as well. In this case, $A_{main}$ and $A_{ref}$ only have to be programmed within the control unit as a function of the height of the two vessels. The total liquid volume $V_{total}$ may be easily calculated by summing $V_{main}$ and $V_{ref}$.

According to a further embodiment, the control unit may be configured to calculate the liquid volume within the main vessel and/or the total liquid volume based on: (i) the reference time measured during a first extraction event, (ii) the reference time measured during a second extraction event following the first extraction event, (iii) the flow rate of the pump, (iv) the amount of liquid selected for the first extraction event, and (v) the amount of liquid selected for the second extraction event.

In this case, the control unit determines the total liquid volume within the main vessel and the reference vessel after two subsequent liquid extractions from the main vessel and the reference vessel. Nevertheless, the basic principle of calculating the liquid volume within the main vessel and/or the total liquid volume based on the reference time and the flow rate of the pump still remains the same. The control unit calculates the volume $V_{ref(t1)}$ pumped from the reference vessel during the first extraction event by multiplying the average flow rate $\theta_{pump}$ with the reference time $t_{ref(t1)}$. The control unit saves $V_{ref(t1)}$ together with the amount of liquid $V_{dose(t1)}$ selected for the first extraction event. As soon as the next, subsequent extraction event arises, e.g. when liquid for a second cup of coffee is extracted, the reference volume $V_{ref(t2)}$ will be calculated again based on $\theta_{pump}$ and $t_{ref(n)}$. The total liquid volume within the main vessel and the reference vessel (together) may then be calculated based on the following equations:

$$\frac{V_{total(t1)} - V_{total(t2)}}{V_{total(t1)}} = \frac{V_{ref(t1)} - V_{ref(t2)}}{V_{ref(t1)}} \quad (6)$$

$$V_{dose(t1)} = V_{total(t1)} - V_{total(t2)} \quad (7)$$

$$V_{total(t1)} = \frac{V_{ref(t1)}}{V_{ref(t1)} - V_{ref(t2)}} \times V_{dose(t1)} \quad (8)$$

wherein $V_{total(t1)}$ is the total liquid volume within the main vessel and the reference vessel (together) before the first extraction event; $V_{total(t2)}$ is the total liquid volume within the main vessel and the reference vessel (together) before the second extraction event (after the first extraction event); $V_{ref(t1)}$ is the liquid volume that is extracted from the reference vessel during the first extraction event (if the reference vessel is completely emptied during each extraction event, $V_{ref(t1)}$ also denotes the liquid volume that was in the reference vessel before the first extraction event); $V_{ref(t2)}$ is the liquid volume within the reference vessel extracted during the second extraction event (the liquid volume within the reference vessel after the first extraction event and before the second extraction event); $V_{dose(t1)}$ is the liquid volume that is extracted from the main vessel and the reference vessel together during the first extraction event.

It shall be noted that equation 6 above is based on the consideration that the change of the total volume within the appliance $\Delta V_{total}$ relative to the total volume before the extraction $V_{total(t1)}$ equals the volume change within the reference vessel $\Delta V_{ref}$ relative to the liquid volume within the reference vessel before the extraction $V_{ref(t1)}$.

The liquid volume within the main vessel $V_{main}$ may finally be calculated as follows:

$$V_{main(t1)} = V_{total(t1)} - V_{ref(t1)} \quad (9)$$

$$V_{main(t2)} = V_{main(t1)} - V_{dose(t1)} \quad (10)$$

$$V_{main(t3)} = V_{main(t2)} - V_{dose(t2)} \quad (11)$$

wherein $V_{main(t1)}$ denotes the liquid volume within the main vessel before the first extraction event; $V_{main(t2)}$ denotes the liquid volume within the main vessel after the first extraction event and before the second extraction event; $V_{main(t3)}$ denotes the (current) volume within the main vessel after the second extraction event; $V_{dose(t2)}$ denotes the selected amount of liquid that is extracted from the main vessel and the reference vessel (together) during the second extraction event. It shall be noted that the above-mentioned equations 10 and 11 require $V_{ref}$ to be much smaller than $V_{main}$, so that $V_{main} \approx V_{total}$. If this is not the case, one has to modify equations 10 and 11 in a similar way as explained above for modified equation 2' by taking $V_{ref}$ into account as well.

It shall be also noted that the above-mentioned calculations for $V_{total(t1)}$ may be similarly based on the reference times $t_{ref(t1)}$ and $t_{ref(t2)}$ directly instead of first calculating the reference volumes $V_{ref(t1)}$ and $V_{ref(t2)}$:

$$V_{total(t1)} = \frac{V_{dose(t1)}}{t_{ref(t1)} - t_{ref(t2)}} \times t_{ref(t1)} \qquad (12)$$

wherein $t_{ref(t1)}$ is the reference time measured during the first extraction event, and $t_{ref(t2)}$ is the reference time measured during the second extraction event. So in this embodiment one may either use equation 8 or equation 12 to calculate $V_{total(t1)}$. In both ways, the liquid volume $V_{main}$ within the main vessel then follows from equations 9 to 11.

According to a further embodiment, the measurement device may further comprise a memory unit which is connected to the control unit, wherein the control unit is configured to store the calculated liquid volume of the main vessel in the memory unit. This allows storing the calculated liquid volume of the main vessel $V_{main}$ in the memory unit after each extraction event. The calculated liquid volume $V_{main}$ may thus be recalled from the memory unit for further calculations.

It is particularly preferred that the control unit is configured to store the calculated liquid volume of the main vessel $V_{main}$ and/or the calculated total liquid volume $V_{total}$ together with the measured reference time $t_{ref}$ in the memory unit. If this is done after each extraction event, the memory unit will include after a plurality of extraction events a table in which the plurality of measured reference times $t_{ref}$ are mapped to the respectively calculated liquid volumes of the main vessel $V_{main}$ and/or to the respectively calculated total liquid volumes $V_{total}$. This again means that after a calibration phase the control unit no longer needs to calculate the liquid volume within the main vessel $V_{main}$ and/or the total liquid volume $V_{total}$ in one of the above-mentioned ways, but may directly look up the calculated liquid volume of the main vessel $V_{main}$ and/or the total liquid volume $V_{total}$ corresponding to a certain reference time $t_{ref}$ in said table stored in the memory unit. This furthermore provides the advantage that the control unit may immediately identify the correct $V_{main}$ and/or $V_{total}$ after each extraction event, even if the user has previously changed the liquid volume within the main vessel e.g. by (partly) refilling or (partly) emptying the main vessel. Such a table stored in the memory unit furthermore provides the advantage that the measurement becomes more and more exact the more extraction events happen, i.e. the more coffees are brewed.

According to a further embodiment, the measurement device further comprises a restriction element for restricting the liquid from the main vessel to the pump. This restriction element provides the advantage that during each extraction event the pump will initially extract most of the liquid from the reference vessel until the reference vessel is empty. This leads to a further accuracy of the measurement, since the measurement of the reference time $t_{ref}$ does then no longer include any influences of the liquid extracted from the main vessel, or at least less influences of the liquid extracted from the main vessel. As soon as the reference vessel is empty, the pump will extract all the rest of the liquid needed for the extraction event from the main vessel. The restriction element may either be implemented by a constriction within the hose/tube connecting the main vessel to the pump, or by means of a valve that is arranged between the main vessel and the pump.

According to a further embodiment, the measurement device may comprise a first valve and a second valve, wherein the reference vessel is fluidly connected to the pump via the first valve, wherein the main vessel is fluidly connected to the pump via the second valve, wherein the first valve is configured to be closed off as soon as the minimum level sensor detects that a minimum liquid level within the reference vessels is reached, and wherein the second valve is configured to be opened as soon as the minimum level sensor detects that the minimum level within the reference vessel is reached.

These two valves in other words control the liquid supply to the pump in such a way that at the beginning of each extraction event the reference vessel will be emptied first, while no liquid is extracted from the main vessel. As soon as the reference vessel is empty or almost empty, the first valve will close off the connection between the reference vessel and the pump, while the second valve at the same time opens up the connection between the main vessel and the pump, such that the remaining liquid needed for the extraction event only comes from the main vessel. Compared to the provision of a restriction element, this embodiment provides an even more accurate measurement, but on the other hand requires a slightly more complicated and cost-intensive equipment (the two extra valves).

It shall be noted that the measurement device is only optionally equipped with the above-mentioned two valves. According to a further embodiment, the measurement device may only comprise the first valve, which is arranged between the reference vessel and the pump. This first valve may be configured to be closed off as soon as the minimum level sensor detects that a minimum liquid level within the reference vessels is reached. The first valve may in this case be either closed off by means of the control unit or closed off automatically. The minimum level sensor may, for example, comprise a float which is configured to close off the first valve if the minimum liquid level within the reference vessel is reached. The first valve may further comprise a receiving element (e.g. a type of bowl) which is configured to receive the float, i.e. adapted to the shape of the float, and arranged at or near the bottom of the reference vessel. As soon as the liquid volume within the reference vessel reaches the minimum liquid level, the float will couple to the receiving element and thereby close the first valve.

The minimum level sensor may further comprise a first contact sensor which is arranged at or near the first valve and configured to detect a contact of the float with the first valve. The function of the minimum level sensor and the first contact sensor are therewith combined in an intelligent and relatively cost-saving way.

According to a still further embodiment, the measurement device may comprise: (i) a stopper which is arranged within the reference vessel and configured to prevent the float from floating over a predetermined height within the reference vessel; and (ii) a second contact sensor which is arranged at or near the stopper and configured to detect a contact of the float with the stopper.

Said stopper may, for example, be arranged above the first valve at 10% or less of the height of the reference vessel. The combination of the stopper and the second contact sensor provides several advantages: 1. The Stopper prevents the float from falling out of the reference vessel when the user empties both vessels by hand. 2. The second contact sensor may function as a detector for detecting whether the main vessel and/or the reference vessel are correctly installed in the device. If the main vessel is not correctly connected to the reference vessel, no liquid will flow into the reference vessel, such that the float will remain at the bottom of the reference vessel without contacting the second contact sensor. As soon as the main vessel is correctly connected to the reference vessel, liquid will flow into the reference vessel and push the float upwards against the stopper. This may be detected by means of the second contact sensor. 3. The second contact sensor may furthermore act as a detector for detecting a minimum liquid level within the main vessel. The stopper may thereto be arranged within the reference vessel at a height that corresponds to the height within the main vessel at which the liquid volume within the main vessel is e.g. smaller than the need for the largest possible beverage that is usually dispensed with the beverage dispenser.

Preferred embodiments of the invention are defined in the dependent claims. It shall be understood that the claim method has similar and/or identical preferred embodiments as the claimed device and as defined in the dependent claims.

BRIEF DESCRIPTION OF THE DRAWINGS

These and other aspects of the invention will be apparent from and elucidated with reference to the embodiments described hereinafter. In the following drawings FIG. 1A shows a first embodiment of the measurement device according to the present invention, wherein FIG. 1A shows the measurement device in a first operating position.

DETAILED DESCRIPTION OF THE INVENTION

Figure 1A:
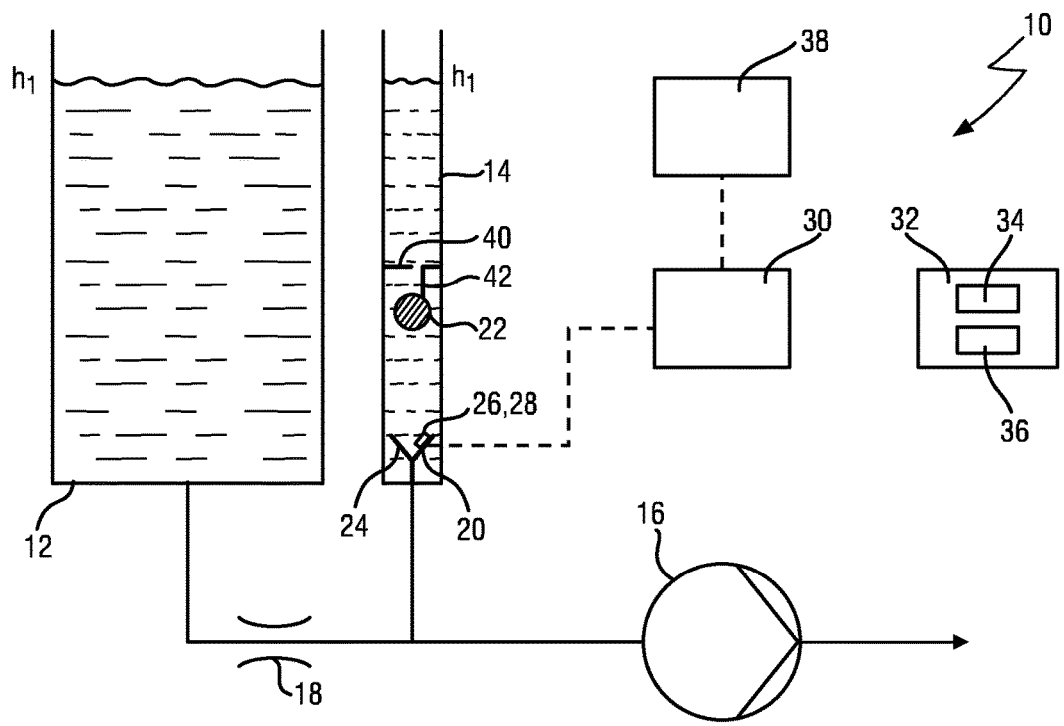
Figure 1B:
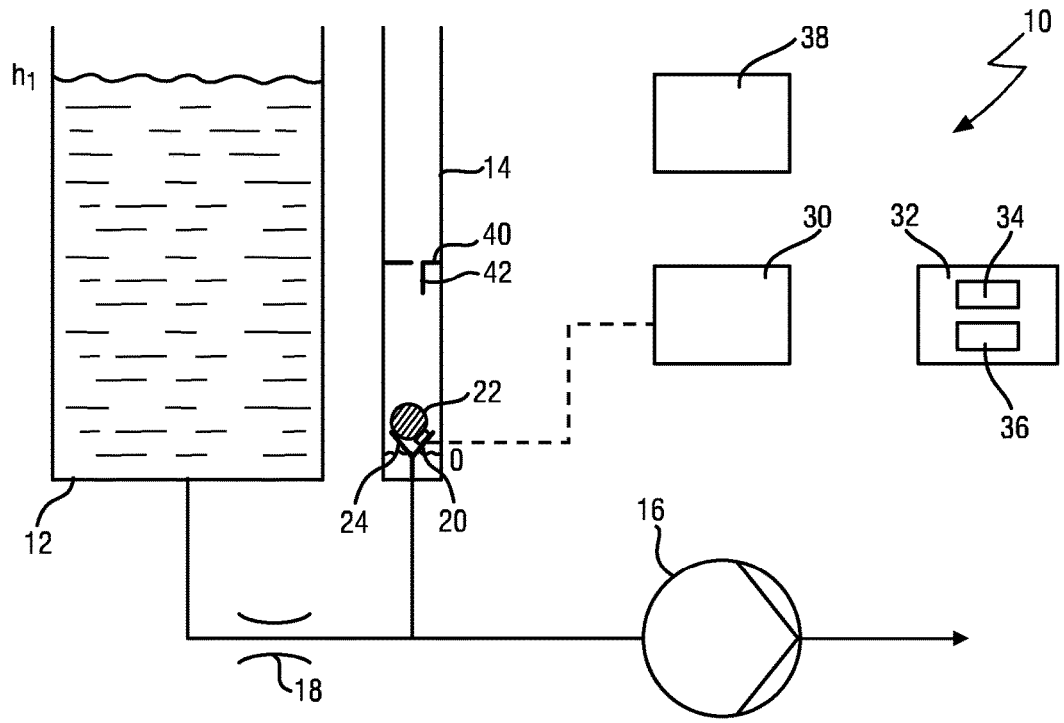
FIG. 1B shows the measurement device in a second operating position.
Figure 1C:
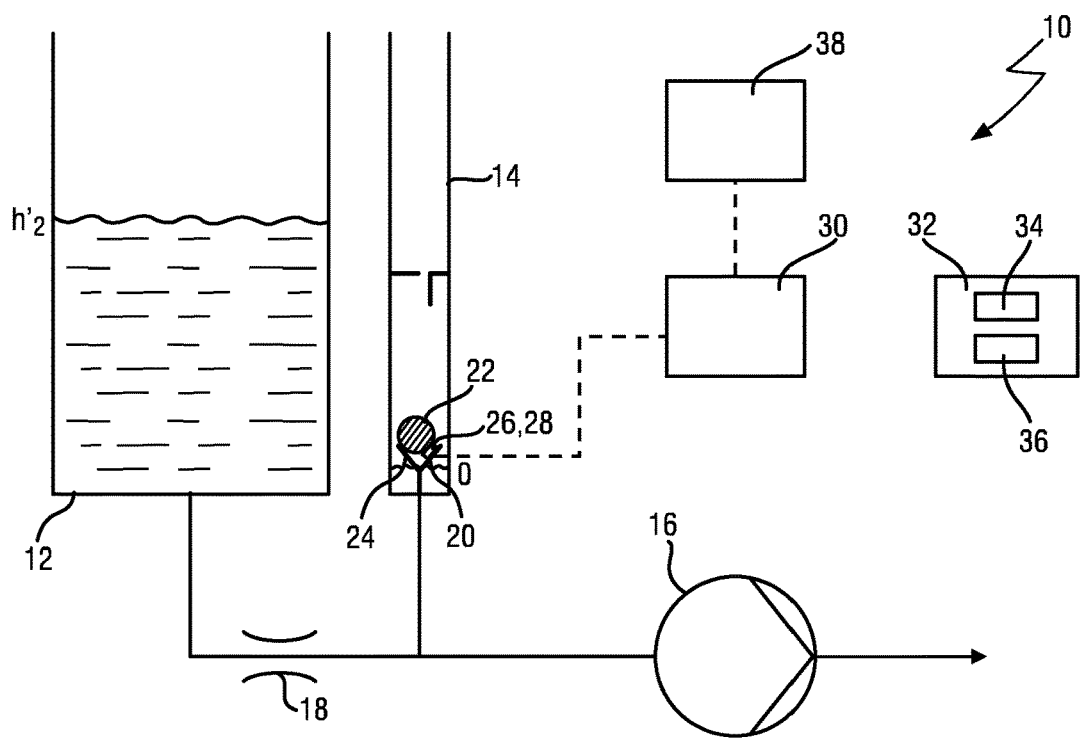
FIG. 1C shows the measurement device in a third operating position.
Figure 1D:
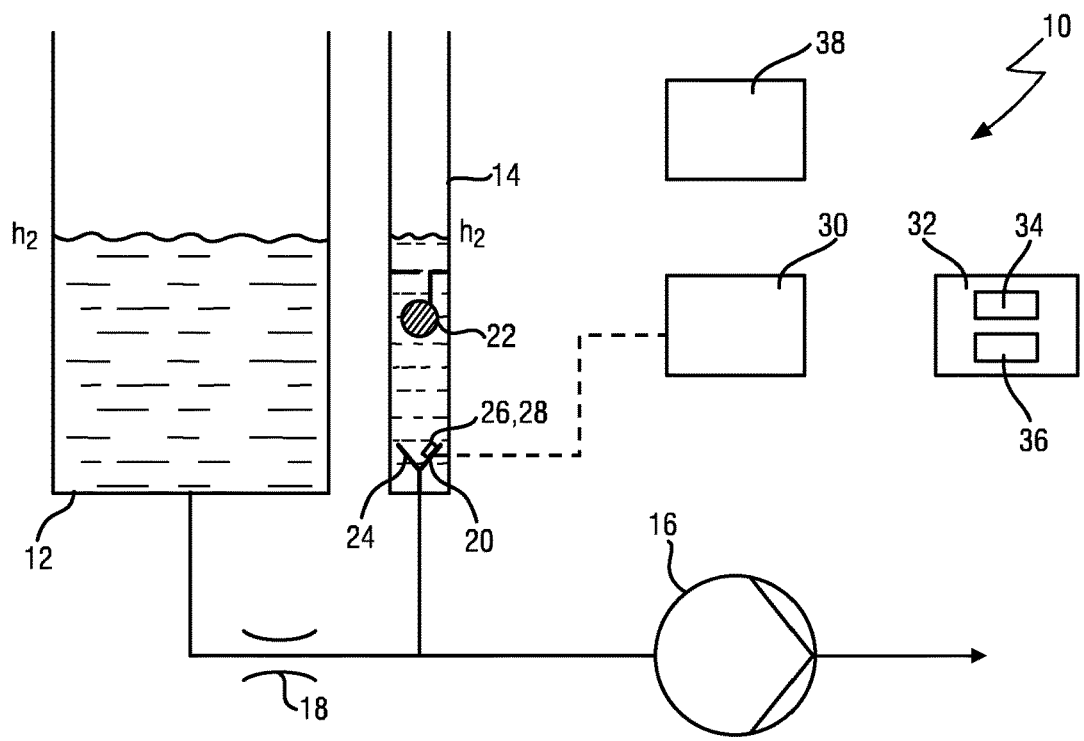
FIG. 1D shows the measurement device in a fourth operating position.

FIG. 1A shows a first embodiment of a measurement device according to the present invention. The measurement device is therein in its entirety denoted by reference numeral 10.

The measurement device 10 comprises a main vessel 12, a reference vessel 14 and a pump 16. If the measurement device 10 is applied in a beverage dispensing machine, the main vessel 12 is realized by the main liquid tank of the machine and the reference vessel 14 may be realized as a riser pipe. Both the main vessel 12 and the reference vessel 14 may have any arbitrary design and shape. The only thing that is important is that the reference vessel 14 has a smaller volume than the main vessel 12. In a typical arrangement the volume of the reference vessel 14 will be in the order of 10% or less, or even in the order of 5% or less of the volume of the main vessel 12.

It is furthermore important that the main vessel 12 and the reference vessel 14 are fluidly connected to each other as two communicating vessels. As long as the same pressure (atmospheric pressure) is applied to the liquid within the main vessel 12 and the liquid within the reference vessel 14, the liquid will balance out to the same level $h_1$ in both vessels 12, 14.

The pump 16 is fluidly connected to both vessels 12, 14. The pump 16 may thus extract liquid from both vessels 12, 14. A customary pump may generally be used for the pump 16. However, it is preferred to use a pump 16 with a constant flow rate, since this facilitates the measurement of the measurement device 10, as it will be outlined in detail below.

According to the first embodiment shown in FIG. 1A, the main vessel 12 is connected to the pump 16 via a restriction element 18. This restriction element 18 is configured to restrict the liquid flow from the main vessel 12 to the pump 16. However, it shall be noted that the restriction element 18 has to be configured to only partly restrict the liquid flow, since the functional principle of two communicating vessels 12, 14 would otherwise be impeded. A too strong restriction would on the other hand also impede the extraction of liquid from the main vessel 12 by means of the pump 16. The restriction element 18 may, for example, be realized as a constriction within the tube or hose that connects the main vessel 12 to the pump 16. However, the restriction element 18 may also comprise a valve that restricts or stops the liquid flow from the main vessel 12 to the pump 16 until the reference vessel 14 is empty and then opens up the connection between the main vessel 12 and the pump 16 again.

The reference vessel 14 is according to the first embodiment connected to the pump 16 via a valve 20. The valve 20 is arranged within the reference vessel 14. According to the exemplary embodiment shown in FIG. 1A, this valve 20 is realized as a float operated valve. It comprises a float 22 which is configured to float within the liquid contained in the reference vessel 14. The float 22 should thus be made of a material having a density which is smaller than the density of the liquid that is used within the measurement device 10 (if the measurement device 10 is applied in a beverage dispensing machine, the liquid is usually water). The valve 20 in this example furthermore comprises a receiving element 24 that is configured to receive the float 22. This receiving element 24 may be realized as a kind of bowl that is adapted to the shape of the float 22. The receiving element 24 is preferably arranged at or near a lower end of the reference vessel 14, i.e. in the area of a minimum liquid level within the reference vessel 14.

The exemplarily shown float operated valve 20 works as follows: If the liquid contained in the reference vessel 14 is above the minimum liquid level, the float 22 will float within the liquid such that it is not connected to the receiving element 24. As soon as the liquid level within the reference vessel 14 falls below the minimum liquid level, the float 22 will connect to the receiving element 24 and thereby close the valve 20, i.e. close off the connection between the reference vessel 14 and the pump 16. In the latter case, the valve 20 also closes off the connection between the main vessel 12 and the reference vessel 14. The main vessel 12 and the reference vessel 14 are thus only communicating with each other as long as the valve 20 is opened.

The measurement device 10 further comprises a minimum level sensor 26 that detects a minimum liquid level within the reference vessel 14. It may, for example, detect if the reference vessel 14 is empty or not. According to the exemplary embodiment shown in FIG. 1A, said minimum level sensor 26 is combined with the valve 20. The minimum level sensor 26 may comprise a contact sensor 28 that is arranged at or near the receiving element 24 of the valve 20. Said contact sensor 28 is configured to detect a contact of the float 22 with the valve 20/the receiving element 24. As soon as a contact of the float 22 with the valve 20 is detected by means of the contact sensor 28, the minimum level sensor 26 will generate a signal which is herein denoted as reference signal.

It shall be noted that the present invention is not limited to the usage of a float operated valve and a minimum level sensor comprising a contact sensor as shown in the exemplary embodiment of FIG. 1A. The same functional principle could also be achieved by means of an electronically actuated valve 20 and a minimum level sensor 26 that optically, mechanically, inductively or capacitively detects a minimum liquid level within the reference vessel 14.

The presented measurement device 10 further comprises a control unit 30 for controlling the operation of the device 10. This control unit 30 may be realized as a processor or microcontroller having software stored thereon for controlling the various elements of the measurement device 10. The control unit 30 is preferably connected to the pump 16 and to the minimum level sensor 26, as this is indicated in FIG. 1A by means of the dotted lines. The connections between the control unit 30, the pump 16 and the minimum level sensor 26 may be either realized as a wireless connection or as a hard-wired connection.

The operation of the measurement device 10 shall now be explained in detail with reference to FIGS. 1A-1D:

FIG. 1A shows the initial situation in which liquid has been filled into the main vessel 12 and the liquid has been balanced out between the main vessel 12 and the reference vessel 14. The liquid within both vessels 12, 14 is thus at the same height $h_1$. The valve 20 is in its open position such that the pump 16 may extract liquid from both the main vessel 12 and the reference vessel 14. A user may now activate the pump 16 to start the liquid extraction. This could be done by means of a user interface 32 which comprises a display 34 and a selector 36. In an application within a beverage dispensing machine, the user may e.g. select an amount of liquid $V_{dose}$ that shall be extracted on total from the main vessel 12 and the reference vessel 14. The selector 36 may thus comprise a mechanical bottom or a touchscreen allowing the user to select said amount of liquid $V_{dose}$. It shall be noted, however, that users of beverage dispensing machines do not always directly select a certain amount of liquid to be extracted $V_{dose}$, but rather select a type of predefined recipe (e.g. an espresso, a small coffee or a large coffee). The control unit 30 in such cases calculates $V_{dose}$ or takes it from a look-up table that is stored in a memory unit 38 connected to the control unit 30. The control unit 30 will then also calculate the time $t_{pump}$ the pump 16 needs to be activated in order to extract the amount $V_{dose}$. This information may also be stored in a look-up table in the memory unit 38, such that it does not necessarily need to be calculated every time based on the flow rate $\theta_{pump}$ of the pump 16.

Upon activation, the pump 16 will then begin extracting liquid from the main vessel 12 and the reference vessel 14. Due to the restriction element 18, most of the liquid will be drawn in the beginning from the reference vessel 14. The reference vessel 14 will thus empty first. Depending on the liquid level within the reference vessel 14, this will take a certain amount of time and will be noticed by means of the minimum level sensor 26. As soon as the liquid level within the reference vessel 14 reaches the minimum liquid level, the float 22 contacts the valve 20 and thereby closes it (see FIG. 1B). The contact sensor 28 will detect this contact and send the reference signal to the control unit 30. The connection between the reference vessel 14 and the pump 16 is then closed off so that the pump 16 will continue to extract liquid from the main vessel 12 only (see FIG. 1C). The pump 16 will continue to extract liquid until the selected amount $V_{dose}$ is extracted on total. Even though the liquid is then extracted through the restriction element 18, the pump 16 is configured to keep the flow rate at a constant level. The pump 16 may be, for example, configured to adapt this restriction change automatically. As soon as the selected amount $V_{dose}$ is extracted on total, the control unit 30 will stops/deactivates the pump 16 and thereby finalizes the extraction event. An extraction event denotes the event between the activation and the subsequent deactivation of the pump 16, i.e. a full cycle for extracting the selected amount of liquid $V_{dose}$ from the system. As soon as the pump 16 is deactivated by the control unit 30, the valve 20 opens up automatically, since the float 22 will rise within the reference vessel 14. The main vessel 12 and the reference vessel 14 may then communicate with each other again, such that the liquid level within both vessels 12, 14 will balance out again (see FIG. 1D). The liquid level within both vessels 12, 14 will then be at a height $h_2$, wherein $h_2 < h_1$ (compare FIG. 1A and FIG. 1D).

During the extraction event, the control unit 30 may measure the time (herein denoted as reference time) between the activation of the pump 16 and the receipt of the reference signal. After the (first) extraction event, the control unit 30 may then calculate the liquid volume $V_{main(t1)}$ that the main vessel 12 contained before the extraction event. The control unit 30 may also calculate the liquid volume $V_{main(t2)}$ that the main vessel 12 contained after the extraction event. This calculation may be based on the reference time $t_{ref}$ and the flow rate $\theta_{pump}$ of the pump 16.

An easy way of calculating $V_{main}$ is by additionally taking into account the amount of liquid selected by the user $V_{dose}$ and the geometrical dimensions of the main vessel 12 and the reference vessel 14. An example for such a calculation is given below:

EXAMPLE 1

A main vessel 12 is used which has a cross-sectional area $A_{main}$=3925 mm$^2$, wherein said cross-sectional area $A_{main}$ is constant along the height of the main vessel 12. A reference vessel 14 is used which has a cross-sectional area $A_{ref}$=200 mm$^2$ that is also constant along the height. A reference time $t_{ref}$ of 10 s has been measured during the extraction event. The pump 16 has a constant flow rate $\theta_{pump}$ of 4 ml/s (4000 mm$^3$/s). Taking equation 5, which has been mentioned in the introductory portion of the description, the volume within the main vessel 12 may then be calculated as follows:

$$V_{main} = \frac{V_{ref}}{A_{ref}} \times A_{main}$$

$$= \frac{\theta_{pump} \times t_{ref}}{A_{ref}} \times A_{main}$$

$$= \frac{4000 \times 10}{200} \times 3925 \text{ mm}^3$$

$$= 785.000 \text{ mm}^3$$

$$= 785 \text{ ml}$$

It is clear that $V_{main}$ in the above-mentioned example indicates the liquid volume within the main vessel 12 before the extraction event ($V_{main(t1)}$). However, if the selected amount of liquid extracted on total $V_{dose}$ is known as well, the total liquid volume $V_{total(t2)}$ that is within the main vessel 12 and the reference vessel 14 together after the extraction event may be easily calculated as follows:

$$V_{total(t2)} = V_{total(t1)} - V_{dose} = V_{main(t1)} + V_{ref(t1)} - V_{dose}$$

It is also clear that the above-mentioned calculation only becomes exact if it is assumed that all the liquid is in the beginning extracted from the reference vessel 14 and no leakages occur at that time at the restriction element 18. It should be also noted that the above-mentioned exemplary calculation is only possible if the geometrical dimensions $A_{main}$ and $A_{ref}$ of the main vessel 12 and the reference vessel 14 are known.

If the dimensions $A_{main}$ and $A_{ref}$ are not known, the control unit 30 may calculate $V_{main}$ in another way. This will be shown in Example 2 given below. The calculation in Example 2 is still based on the measured reference time $t_{ref}$ and the flow rate of the pump $\theta_{pump}$. However, $V_{main}$ is now calculated after two subsequent extraction events, e.g. after the user has withdrawn two drinks from the system. $V_{main}$ is then calculated based on the consideration that the change of the total volume within the appliance $\Delta V_{total}$ divided by the total volume before the extraction $V_{total(t1)}$ equals the volume change within the reference vessel $\Delta V_{ref}$ divided by the liquid volume within the reference vessel before the extraction $V_{ref(t1)}$ (see equations 6 to 8 indicated in the introductory portion of the description).

EXAMPLE 2

The amount of extracted liquid $V_{dose(t1)}$ selected by the user during the first extraction event is $V_{dose(t1)}=120$ ml. The average flow rate $\theta_{pump}$ is 4 ml/s. The reference time $t_{ref(t1)}$ measured during the first extraction event is $t_{ref(t1)}=3.1$ s. The liquid volume that the reference vessel 14 contained before the extraction event may thus be calculated (:

$$V_{ref(t1)} = \theta_{pump} \times t_{ref(t1)} = 4 \text{ ml/s} \times 3.1 \text{ s} = 12.4 \text{ ml.}$$

In the second extraction step, the user selects an amount of liquid $V_{dose(t2)}$ of 100 ml. The reference time $t_{ref(t2)}$ measured by the control unit 30 during the second extraction event is 2.8 s. $\theta_{pump}$ remains the same (4 ml/s). The reference vessel 14 thus contained a volume $V_{ref(t2)}$ before the second extraction event of:

$$V_{ref(t2)} = \theta_{pump} \times t_{ref(t2)} = 4 \text{ ml/s} \times 2.8 \text{ s} = 11.2 \text{ ml.}$$

The total liquid volume $V_{total}$ and/or the liquid volume $V_{main}$ within the main vessel 12 before the first extraction event ($V_{total(t1)}$ and/or $V_{main(t1)}$), after the first extraction event ($V_{total(t2)}$ and/or $V_{main(t2)}$), and after the second extraction event ($V_{total(t3)}$ and/or $V_{main(t3)}$) may then be calculated by means of the above-mentioned equations 8 to 11:

$$V_{total(t1)} = \frac{V_{ref(t1)}}{V_{ref(t1)} - V_{ref(t2)}} \times V_{dose(t1)}$$

$$= \frac{12.4}{12.4 - 11.2} \times 120 \text{ ml}$$

$$= 1240 \text{ ml}$$

$$V_{main(t1)} = V_{total(t1)} - V_{ref(t1)} = 1240 \text{ ml} - 12.4 \text{ ml} = 1227.6 \text{ ml}$$

$$V_{main(t2)} = V_{main(t1)} - V_{dose(t1)} = 1227.6 \text{ ml} - 120 \text{ ml} = 1107.6 \text{ ml}$$

$$V_{main(t3)} = V_{main(t2)} - V_{dose(t2)} = 1107.6 \text{ ml} - 100 \text{ ml} = 1007.6 \text{ ml}$$

It is clear that the liquid volume $V_{total(t1)}$, which was present within the main vessel 12 and the reference vessel 14 before the first extraction event, may also be calculated by means of equation 12 instead of equation 8:

$$V_{total(t1)} = \frac{V_{dose(t1)}}{t_{ref(t1)} - t_{ref(t2)}} \times t_{ref(t1)}$$

$$= \frac{120}{3.1 - 2.8} \times 3.1 \text{ ml}$$

$$= 1240 \text{ ml}$$

The volume within the main vessel 12 may thus be also calculated if the geometrical dimensions of the main vessel 12 and the reference vessel 14 are not known. The calculated liquid volumes $V_{total}$ and/or $V_{main}$ may be shown to the user on the display 34. However, the calculation according to Example 2 requires two extraction events (two drink extractions) which might be disadvantageous, since users usually want to see directly if enough liquid is left in the device.

Figures 2, 3:
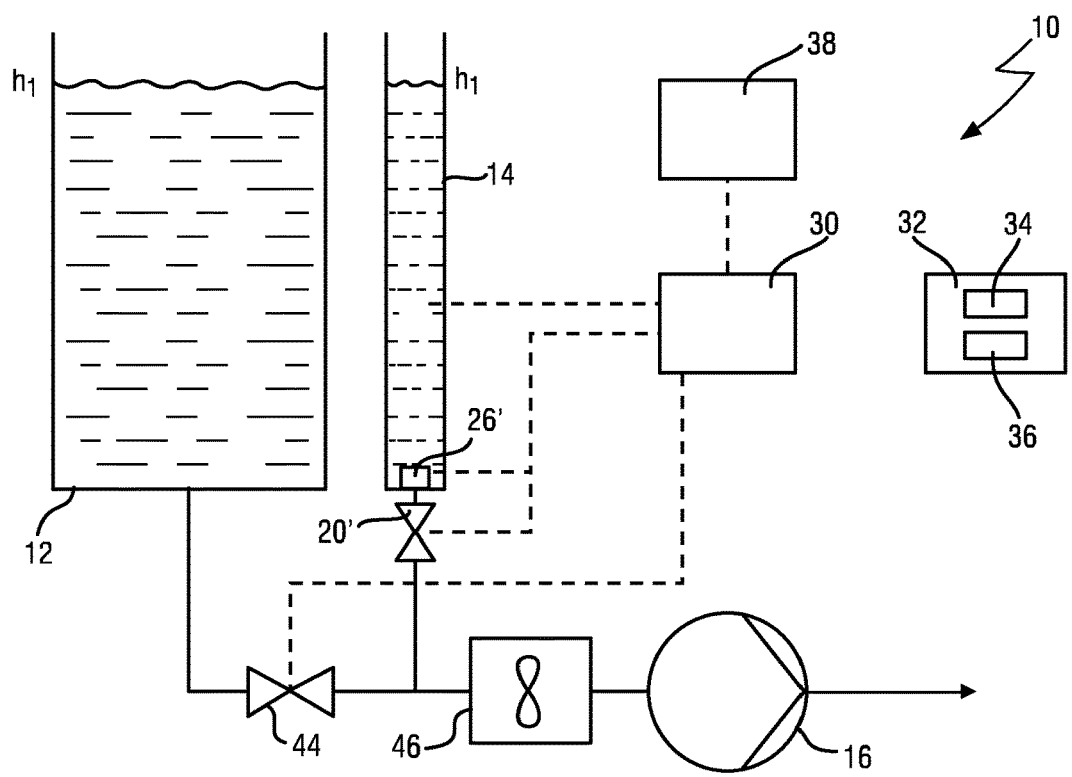
FIG. 2 shows a second embodiment of the measurement device according to the present invention.
FIG. 3 shows an example of a look-up table stored within a memory unit of the measurement device according to the present invention.

The presented measurement device 10 may be improved in a way that such a direct indication of the liquid volume on the display 34 is possible as well. The control unit 30 may thereto store the measured reference time $t_{ref}$ together with the calculated volumes $V_{total}$ and/or $V_{main}$ in a look-up table within the memory unit 38 after each extraction event. If this is done a plurality of times, i.e. after a plurality of extraction events, the look-up table within the memory unit 38 contains enough data. After this initialization phase, the control unit 30 does then no longer have to calculate $V_{total}$ and/or $V_{main}$ each time in one of the above-mentioned exemplary ways, but may look up $V_{total}$ and/or $V_{main}$ directly from the look-up table stored within the memory unit 38. An example of such a look-up table is schematically shown in FIG. 3. The look-up table of shown in FIG. 3 only shows the correlation of $V_{main}$ and $t_{ref}$. However, it is clear that $V_{total}$ may be included in the look-up table as well.

The above-mentioned look-up table thus accelerates the measurement and also provides the advantage that the measurements become more and more accurate after each extraction event. If a measured reference time $t_{ref}$ is not already included in said look-up table, $V_{total}$ and/or $V_{main}$ can be calculated in one of the above-mentioned ways and a new entry in the look-up table may be made. Alternatively, the control unit 30 can be configured to interpolate between the two next closest reference times $t_{ref}$ that are already included in the memory unit 38. This will of course require a substantially linear relationship between $t_{ref}$ and $V_{total}$ and/or a linear relationship between $t_{ref}$ and $V_{main}$.

The measurement device 10 may still comprise some further improvements: According to the exemplary embodiment of the measurement device 10 shown in FIG. 1, the measurement device 10 further comprises a stopper 40 which is arranged within the reference vessel 14. This stopper 40 is configured to prevent the float 22 from floating over a predetermined height within the reference vessel 14. It may be realized by a simple mechanical stopper element that projects into the reference vessel 14 at a certain height. The measurement device 10 may further comprise a second contact sensor 42 which is arranged at or near the stopper 40 and configured to detect a contact of the float 22 with the stopper 40.

The inclusion of such a stopper 40 and contact sensor 42 provides the following advantages: 1.) The stopper 40 prevents the float 22 from unintentionally falling out of the reference vessel 40 if the user manually empties the two vessels 12, 14. 2.) The second contact sensor 42 may be used to detect the presence of the main vessel 12. The main vessel 12 may, for example, be separately detachable from the device 10. If the user detaches the main vessel 12, e.g. to refill it, the liquid level within the reference vessel 14 will decline, so that the float 22 will no longer be pushed against the stopper 40. This may be detected by the contact sensor 42. 3.) The stopper 40 and the second contact sensor 42 may also be used as a minimum level detector in order to detect whether the liquid level within the main vessel 12 is above a certain minimum threshold.

It is also possible to combine the first and second contact sensors 26, 42 and the minimum level sensor 26 with each other. The stopper 40 has to be thereto arranged near the minimum level sensor 26, i.e. in close proximity to the minimum liquid level within the reference vessel 14. In this case the first and second contact sensors 26, 42 may be combined in only one sensor.

FIG. 2 shows a second embodiment of the measurement device 10. The functional principle remains the same as explained before with reference to the first embodiment shown in FIG. 1A. However, some modifications are made therein. Instead of the flow operated valve 20, a valve 20' is provided that may be electronically actuated by the control unit 30. In this case, the control unit 30 is configured to close off the valve 20' upon receipt of the reference signal. Instead of the restriction element 18, a second valve 44 is provided between the pump 16 and the main vessel 12. This second valve 44 is preferably realized as an electronically actuatable valve as well. The control unit 30 may thus control the valves 20' and 44 as follows: In the beginning both valves 20', 44 will be opened, such that the main vessel 12 and the reference vessel 14 communicate with each other and balance out their liquid levels. As soon as the pump 16 is started, the first valve 20' is opened and the second valve 44 is closed off. This ensures that the pump 16 extracts in the beginning liquid only from the reference vessel 14. As soon as the reference vessel 14 gets empty (detected by the minimum level sensor 26'), the first valve 20' will be closed off and the second valve 44 will be opened. The first valve 20' will be kept closed until the end of the extraction event and then opened up again, so that the two vessels 12, 14 may communicate with each other again.

The measurement may be still further improved by the inclusion of a means for measuring the flow rate of the liquid extracted from the main vessel 12 and the reference vessel 14. This may be realized by a flow meter 46 that is either arranged before or after the pump 16. This flow meter 46 may also be connected to the control unit 30.

It shall be noted that the modified components of the second embodiment may be also implemented within the measurement device 10 according to the first embodiment either separately or altogether. The first embodiment could, for example, be modified by simply replacing the restriction element 18 by the second valve 44. It could also be modified by simply adding the flow meter 46 and/or by replacing the float operated valve 20 by the electronically actuated valve 20'.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A measurement device for measuring a volume of liquid contained in a vessel, comprising:
   a main vessel for receiving a liquid;
   a reference vessel which has a smaller volume than the main vessel, wherein the main vessel and the reference vessel are fluidly connectable to each other as communicating vessels;
   a pump which is connected to the main vessel and the reference vessel for extracting liquid from the main vessel and the reference vessel;
   a minimum level sensor which is configured to send a reference signal if a minimum liquid level within the reference vessel is reached;
   a first valve via which the reference vessel is fluidly connected to the pump, wherein the first valve is configured to be closed off if the minimum liquid level within the reference vessel is reached; and
   a control unit which is connected to the minimum level sensor and the pump and configured to measure a reference time between an activation of the pump and a receipt of the reference signal, wherein the control unit is further configured to calculate, based on the reference time and a flow rate of the pump, a liquid volume within the main vessel and/or a total liquid volume within the main vessel and the reference vessel together.

2. The measurement device according to claim 1, further comprising a selector for selecting an amount of liquid to be extracted from the main vessel and the reference vessel by means of the pump during an extraction event, wherein an extraction event denotes the event between an activation and a subsequent deactivation of the pump.

3. The measurement device according to claim 2, wherein the control unit is configured to calculate the liquid volume within the main vessel and/or the total liquid volume additionally based on the selected amount of liquid.

4. The measurement device according to claim 1, wherein the control unit is configured to calculate the liquid volume within the main vessel and/or the total liquid volume additionally based on a geometrical dimension of the main vessel and the reference vessel.

5. The measurement device according to claim 2, wherein the control unit is configured to calculate the liquid volume within the main vessel and/or the total liquid volume based on: (i) the reference time measured during a first extraction event, (ii) the reference time measured during a second extraction event following the first extraction event, (iii) the flow rate of the pump, (iv) the amount of liquid selected for the first extraction event, and (v) the amount of liquid selected for the second extraction event.

6. The measurement device according to claim 1, further comprising a memory unit which is connected to the control unit, wherein the control unit is configured to store the measured reference time, the calculated liquid volume of the main vessel and/or the calculated total liquid volume in the memory unit.

7. The measurement device according to claim 1, further comprising a restriction element for restricting a liquid flow from the main vessel to the pump.

8. The measurement device according to claim 7, wherein the minimum level sensor comprises a float which is configured to close off the first valve if the minimum liquid level within the reference vessel is reached.

9. The measurement device according to claim 8, wherein the minimum level sensor comprises a first contact sensor which is arranged at or near the first valve and configured to detect a contact of the float with the first valve.

10. The measurement device according to claim 8, further comprising: (i) a stopper which is arranged within the reference vessel and configured to prevent the float from floating over a predetermined height within the reference vessel; and (ii) a second contact sensor which is arranged at or near the stopper and configured to detect a contact of the float with the stopper.

11. The measurement device according to claim 1, further comprising a second valve, wherein the main vessel is connected to the pump via the second valve, wherein the first valve is configured to be closed off as soon as the minimum level sensor detects that a minimum liquid level within the reference vessel is reached, and wherein the second valve is configured to be opened as soon as the minimum level sensor detects that the minimum liquid level within the reference vessel is reached.

12. The measurement device according to claim 1, wherein the pump is, upon activation, configured to generate a liquid flow rate which is constant over time.

13. The measurement device according to claim 1, further comprising a flow meter for measuring the flow rate of the liquid extracted from the main vessel and the reference vessel.

14. Beverage dispensing machine comprising the measurement device as claimed in claim 1.

* * * * *